United States Patent Office 2,929,813
Patented Mar. 22, 1960

2,929,813

14,15-OXIDO-STEROIDS OF THE PREGNANE SERIES

Barry M. Bloom and Eugene J. Agnello, Jackson Heights, Gilbert M. Shull, Huntington Station, and Gerald D. Laubach, Jackson Heights, N.Y., assignors to Chas. Pfizer & Co., Inc., New York, N.Y., a corporation of Delaware No Drawing. Application October 1, 1954
Serial No. 459,848

4 Claims. (Cl. 260—239.55)

This invention is concerned with the synthesis of 11β,14α,17α,21-tetrahydroxy-4-pregnene-3,20-dione, also called 14α-hydroxy Compound F, and of the 21-position esters and ethers thereof. These compounds are shown below in Formula I, where R is selected from the group consisting of hydroxyl and esters and ethers thereof containing from one to ten carbon atoms in the added moiety.

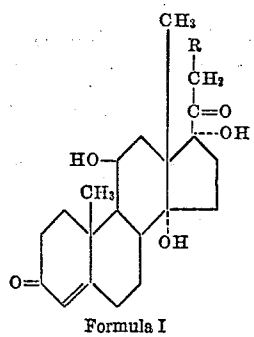

Formula I

This invention is also concerned with certain novel steroid compounds which are the products of various steps of this synthesis.

The starting materials for this synthesis are 14α,17α,21-trihydroxy-4-pregnene-3,20-dione also called 14α-hydroxy Compound S, and the 21-position esters and ethers thereof. These compounds are shown below in Formula II. In this formula, and in each of the subsequent formulas in this application, R has the same meaning as in Formula I, i.e., R is selected from the group consisting of hydroxyl and esters and ethers thereof containing from one to ten carbon atoms in the added moiety.

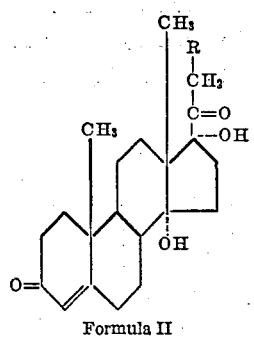

Formula II

A method of obtaining the compound 14α,17α,21-trihydroxy-4-pregnene-3,20-dione has been described in U.S. Patent No. 2,673,866. As the 21-position hydroxyl group is the only primary alcohol group in the molecule, it may be selectively esterified and etherified by standard procedures. In general esters and ethers containing from one to ten carbon atoms are so made. The esters include, for example, the acetate, propionate, trimethylacetate, benzoate, hexahydrobenzoate, hemisuccinate and hemiphthalate, and the ethers include, for example, methyl, ethyl and benzyl.

The compound 14α-hydroxy Compound F and its 21-esters and ethers are extremely valuable. 14α-hydroxy Compound F possesses great biological activity, especially adrenocortical type activity such as has been found to be of great utility in the treatment of various diseases, for example arthritis. The activity of 14α-hydroxy Compound F rivals that of Compound F itself.

As will be seen from an inspection of the above formulas, the over all net result of the synthesis is the introduction of an 11β-hydroxyl group. If this introduction is attempted directly in one step, however, for example by the use of organisms of the genus Curvularia (see U.S. Patent No. 2,658,023) the yields are such that the process is not commercially attractive. For some unknown reason, the presence of the 14α-hydroxyl group in the starting material reduces the yield of the 11β-hydroxylated product. This present invention overcomes that difficulty and provides a commercially attractive method for accomplishing the synthesis of these very useful compounds.

The first step of this present synthesis comprises treating a compound having Formula II, preferably with the 21-OH group protected as an ester such as the acetate, with a non-oxidizing strong acid in an organic solvent. The term strong acid is used to indicate a substance which when dissolved in water ionizes to yield hydrogen ions to at least as great an extent as does acetic acid. A substance is non-oxidizing when none of its atoms undergoes a decrease in valence during the reaction. Useful non-oxidizing strong acids include, for example, hydrochloric acid, oxalic acid, and preferably paratoluenesulfonic acid. The organic solvent benzene is particularly useful. Other solvents also having value include toluene, carbon tetrachloride, chloroform, cyclohexane and dioxane. This treatment results in the removal of the OH group at the 14 position and the introduction of a double bond between the 14 and 15 positions, thereby yielding a compound having Formula III, which shows 17α,21-dihydroxy-4,14-pregnadiene-3,20-dione and its 21-position esters and ethers. These are new compounds.

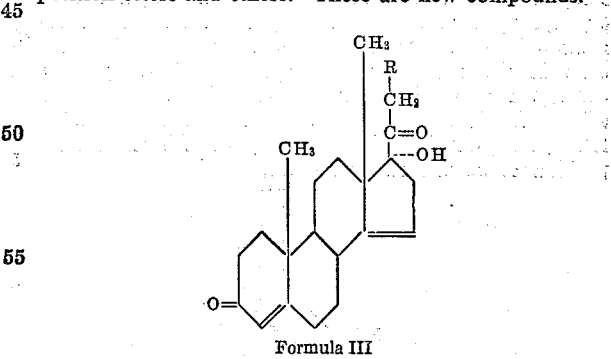

Formula III

A compound having Formula III is the starting material for the next step. This next step comprises treating the compound with an oxidizing agent selected from the group consisting of organic peracids, for example perbenzoic acid or perphthalic acid, and inorganic oxidizing agents, especially chromate oxidizing agents, i.e. compounds containing chromium with a valence of six, for example sodium chromate, potassium chromate and potassium dichromate. This step results in the formation of an epoxide ring at the 14α,15α position, and yields a compound having Formula IV, which shows 17α,21-dihydroxy-14α,15α-epoxido-4-pregnene-3,20-dione and its 21-position esters and ethers. These are also new compounds.

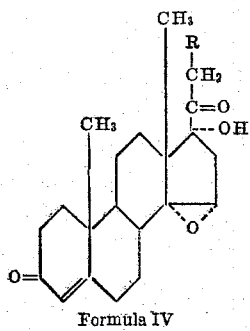

Formula IV

An 11β-hydroxyl group is next introduced into a compound having Formula IV by contacting the compound with the oxygenating activity of an organism chosen from the genus Curvularia (see U.S. Patent No. 2,658,023). It has now unexpectedly been discovered that while, as mentioned above, biological 11β-hydroxylation proceeds in poor yield in the presence of a 14α-hydroxyl group, the presence of an epoxide group at the 14α,15α position does not have this effect, and 11β-hydroxylation proceeds in good yield. When a compound having Formula IV is subjected to biological 11β-hydroxylation there is obtained a compound having Formula V, which shows 11β,17α,21 - trihydroxy - 14α,15α - epoxido - 4-pregnene-3,20-dione and its 21-position esters and ethers.

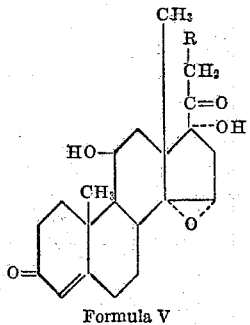

Formula V

Compounds having Formula V have been described in pending application Serial No. 432,621, filed on May 26, 1954, and now abandoned.

The next step in the synthesis comprises treating a compound having Formula V with a hydrogen halide, e.g. hydrogen chloride or hydrogen bromide, in an organic solvent, e.g. acetic acid or chloroform. This results in the opening of the epoxide ring to yield a compound having Formula VI, in which X stands for a halogen atom. Formula VI shows the 11β,14α,17α,21-tetrahydroxy-15β-halo-4-pregnene-3,20-diones and the 21-position esters and ethers thereof.

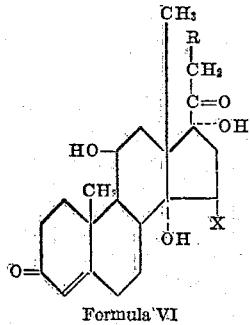

Formula VI

Compounds having Formula VI are also described in the above mentioned pending application Serial No. 432,621, filed on May 26, 1954.

The final step in the synthesis is the replacement by a hydrogen atom of the halogen atom in the 15-position of a compound having Formula VI. This is accomplished by refluxing with Raney nickel in an inert organic solvent such as alcohol, benzene or ethylacetate. Preferably the nickel is pretreated to remove excess alkali. The Raney nickel itself supplies the necessary hydrogen. In this way the desired end product having Formula I is obtained.

To summarize, a compound having Formula II is treated with a non-oxidizing strong acid in an organic solvent, thereby producing a compound having Formula III, which is treated with an organic peracid or a chromate oxidizing agent to produce a compound having Formula IV. This compound is then contacted with the oxygenating activity of an organism chosen from the genus Curvularia to produce a compound having Formula V, which is in turn treated with a hydrogen halide in an organic solvent to yield a compound having Formula VI. The halogen is then removed from the 15-position of this compound and replaced with hydrogen by means of Raney nickel to give the final product.

The following examples are given solely for the purpose of illustration, and are not to be construed as limitations of this invention, many variations of which are possible without departing from the spirit or scope thereof.

EXAMPLE I

*Dehydration of 14-hydroxyl group*

A solution of p-toluenesulfonic acid in benzene was prepared by taking up 400 mg. of the acid monohydrate in 150 ml. of benzene and boiling off a few milliliters of benzene-water azeotrope. The acid solution was then added to 3.94 g. of the 21-acetate of 14α-hydroxy Compound S in 650 ml. of benzene and the mixture heated under reflux in an apparatus containing a Dean-Stark water separator for 16 hours (nitrogen atmosphere). The resultant highly fluorescent orange solution was shaken vigorously with water, aqueous sodium bicarbonate solution, again with bicarbonate solution, and finally with water. During these washes, the organic layer lightened in color from orange to yellow. Removal of the benzene and trituration of the crystalline residue with a small amount of methanol gave 2.38 g. of pale yellow product, M.P. 193.6–198.4°. Further workup of the trituration liquors afforded an additional 577 mg. of orange crystals, bringing the total yield to 79%. Recrystallization from ethyl acetate afforded an analytical sample of 17α,21 - dihydroxy - 4,14 - pregnadien - 3,20 - dione-21-acetate as colorless prisms, M.P. 201.4–202.8°, $\epsilon_{240}^{EtOH} = 16,200$, $[\alpha]_D^{dioxane} + 75°$, $\lambda_{max}^{KBr}$ 3.03, 5.72, 5.80, 6.07, 6.23, 8.13

*Analysis.*—Calcd. for $C_{23}H_{30}O_5$: C, 71.48; H, 7.82. Found: C, 71.71; H, 8.02.

EXAMPLE II

*Preparation of epoxide by organic peracid oxidation*

A solution of 517 mg. (1.33 mM.) of 17α,21-dihydroxy-4,14-pregnadien-3,20-dione-21-acetate in 35 ml. of ethyl acetate was treated with 50 ml. of 0.098 M. perphthalic acid in ether and stored in the dark at room temperature for 22 hours. At this time, titration of an aliquot (along with a solvent blank) revealed that one molar equivalent of peracid had been consumed. The reaction mixture was washed with aqueous sodium bicarbonate solution followed by water, then dried over magnesium sulfate. Evaporation of the solvent produced a colorless glass which was crystallized from ether yielding 398 mg. (72%) of product, M.P. 174.6–175.2°. Recrystallization from methanol afforded pure 17α,21-dihydroxy - 14α,15α - epoxido - 4 - pregnene - 3,20 - dione-21-acetate, M.P. 178.2–179.2°, $\epsilon_{237}^{EtOH} = 17,700$, $[\alpha]_D^{dioxane} + 119.6°$, $\lambda_{max}^{KBr}$ 2.90, 5.78, 6.05, 6.20, 8.10

A sample was dried at 100° (6 hours) for analysis.

*Analysis.*—Calcd. for $C_{23}H_{30}O_6$: C, 68.63; H, 7.51. Found: C, 68.43; H, 7.46.

This experiment was repeated, with the same results, using perbenzoic acid in place of perphthalic acid.

EXAMPLE III

*Preparation of epoxide by chromate oxidation*

A solution of 500 mg. of 17α,21-dihydroxy-4,14- pregnadien-3,20-dione-21-acetate in 25 ml. of glacial acetic acid was treated with 500 mg. of potassium chromate dissolved in 1.5 ml. of water. After standing at room temperature for 18 hours, the excess oxidant was destroyed with sodium sulfite, and most of the acetic acid was neutralized with aqueous sodium hydroxide solution. Extraction with $CHCl_3$, washing of the combined extracts successively with water, aqueous sodium bicarbonate solution and water, drying over magnesium sulfate, and evaporation of the chloroform afforded 425 mg. of colorless glass. Trituration with the minimal amount of methanol gave 205 mg. of crystalline solid, M.P. 173.2–174.0°. Comparison of the infrared spectra, along with the unique papergram mobilities, conclusively demonstrated the identity of this material with the α-oxide prepared by perphthalic acid oxidation.

This experiment was repeated with the same result using sodium chromate instead of potassium chromate. $CrO_3$ has also been so used, as has $K_2Cr_2O_7$.

EXAMPLE IV

*Preparation of epoxide*

The procedure for forming epoxides may also be carried out on compounds having a free 21-position hydroxyl group, as shown by the following experiment. A solution of 17α,21-dihydroxy-4,14-pregnadien-3,20-dione (993 mg.; 2.62 mM.) in 120 ml. of ethyl acetate was treated with 175 ml. of 0.041 M perphthalic acid in ether (7.18 mM.) and allowed to stand at room temperature. After 24 hours titration of an aliquot showed that one equivalent of peracid had been consumed. The reaction mixture was washed successively with aqueous sodium sulfite, sodium bicarbonate solution and water. After drying over sodium sulfate, evaporation of the solvent afforded 895 mg. of crude 17α,21-dihydroxy-14α,15α-epoxido-4-pregnene-3,20-dione. Two recrystallizations from ethyl acetate afforded spikes, M.P. 229.6–232.2°, $\epsilon_{239}^{EtOH} = 17,400$; $\lambda_{max}^{KBr} = 2.92, 5.82, 6.07, 6.22$ $[\alpha]_D^{dioxane} + 135.3°$

*Analysis.*—Calcd. for $C_{21}H_{28}O_5$: C, 69.97; H, 7.83. Found: C, 69.72; H, 7.50.

EXAMPLE V

*Hydroylsis of 21-position ester*

As the 21-position hydroxyl group is the only primary alcohol group present in any of the compounds discussed in this application, it may readily be esterified or etherified by standard means. For some reactions of the present synthesis it is most advantageous to use esters, but these are readily hydroylzed to the corresponding alcohols, as shown by this example and the next example.

Pulverized 17α,21-dihydroxy-4,14-pregnadien-3,20-dione-21-acetate (1.24 g.) was slurried in 12 ml. of methanol under a nitrogen atmosphere and treated with a solution of 225 mg. of potassium carbonate in 2.5 ml. of preboiled water. After stirring at room temperature for 20 minutes a clear solution resulted. This was allowed to stand an additional 50 minutes before adding acetic acid. Crystals soon deposited from the neutral solution, whereupon 3 g. of sodium chloride dissolved in 72 ml. of water was added. The product 17α,21-dihydroxy-4,14-pregnadien-3,20-dione, was separated and recrystallized from ethyl acetate as rosettes, 806 mg., M.P. 195.8–197.2°. Concentration of the ethyl acetate mother liquors afforded an additional 117 mg. of product, M.P. 192.6–195.2°, bringing the total yield to 84%.

A sample was recrystallized from ethyl acetate for analysis, M.P. 196.8–198.8°, $[\alpha]_D^{dioxane} + 52.0°$, $\epsilon_{240}^{ethanol} = 16,100$, $\lambda_{max}^{KBr}$ 2.98, 5.85, 6.05, 6.22

*Analysis.*—Calcd. for $C_{21}H_{28}O_4$: C, 73.22; H, 8.19. Found: C, 72.91; H, 7.97.

EXAMPLE VI

*Hydrolysis of 21-position ester*

1.0 g. of 17α,21-dihydroxy-14α,15α-epoxido-4-pregnene-3,20-dione-21 acetate was pulverized, slurried in 10 ml. of methanol and treated under nitrogen with a solution of 200 mg. of potassium carbonate in 2.0 ml. of water. After stirring at room temperature for 75 minutes the reaction mixture was neutralized with acetic acid, and the product, 17α,21-dihydroxy-14α,15α-epoxido-4-pregnene-3,20-dione, precipitated by adding aqueous sodium chloride. Filtration afforded the crude alcohol, M.P. 211.4–216.6°. Recrystallization from ethyl acetate afforded the pure compound, identical with the material prepared by perphthalic acid oxidation of 17α,21-dihydroxy-4,14-pregnadien-3,20-dione.

EXAMPLE VII

*11β-hydroxylation by means of a microroganism*

By the method described in U.S. Patent No. 2,658,023, the compound 17α,21-dihydroxy-14α,15α-epoxido-4-pregnene-3,20-dione was subjected to the oxygenating activity of *Curvularia lunata*. The product 11β,17α,21-trihydroxy-14α,15α-epoxido-4-pregnene-3,20-dione was thus obtained in good yield. This compound was described in the above mentioned pending application Serial No. 432,621, filed May 26, 1954.

EXAMPLE VIII

*Opening the epoxide ring*

A solution of 500 mg. of 11β,17α,21-trihydroxy-14α,15α-epoxido-4-pregnene-3,20-dione-21-acetate in 25 ml. of chloroform was treated at –10° C. with 50 ml. of a saturated solution of anhydrous hydrogen bromide in chloroform. After one hour the chloroform solution was washed with water until neutral, then dried over sodium sulfate and evaporated to dryness. The solid residue was triturated with ether and recrystallized from an ethyl acetate-cyclohexane mixture. The product was 11β,14α,17α,21-tetrahydroxy- 15β-bromo - 4 - pregnene-3,20-dione-21-acetate.

When this experiment was repeated using hydrogen chloride instead of hydrogen bromide the product was the corresponding 11β,14α,17α,21 - tetrahydroxy - 15β-chloro-4-pregnene-3,20-dione-21-acetate. Both the compounds were also described in application Serial No. 432,621.

EXAMPLE IX

*Removal of 15-position halogen*

100 mg. of 11β,14α,17α,21-tetrahydroxy-15β-bromo-4-pregnene-3,20-dione was refluxed for 22 hours in ethyl acetate with 2 grams (wet weight) of Raney nickel. 14α-hydroxy Compound F was produced.

What is claimed is:

1. A process for preparing a compound having the formula

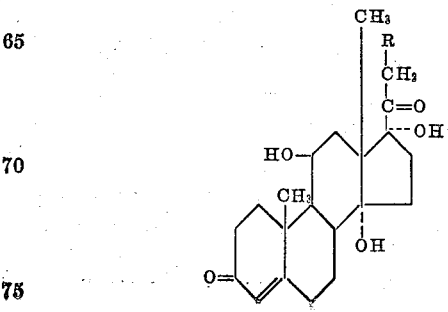

wherein R is chosen from the class consisting of hydroxyl and hydrocarbon acyloxy groups containing from one to ten carbon atoms in the added moiety, said process comprising the steps:

(a) Treating a compound having the formula

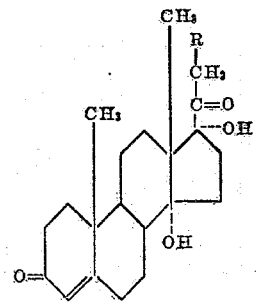

wherein R is chosen from the class consisting of hydroxyl and hydrocarbon acyloxy groups containing from one to ten carbon atoms in the added moiety, with a non-oxidizing strong acid in the presence of an organic solvent;

(b) Treating a compound obtained by step a with an oxidizing agent selected from the group consisting of organic peracids and chromate oxidizing agents;

(c) Contacting a compound obtained by step b with the oxygenating activity of an organism chosen from the genus Curvularia;

(d) Treating a compound obtained by step c with a hydrogen halide in an organic solvent; and (e) Refluxing a compound obtained by step d with Raney nickel in an inert organic solvent.

2. A process for preparing a compound having the formula

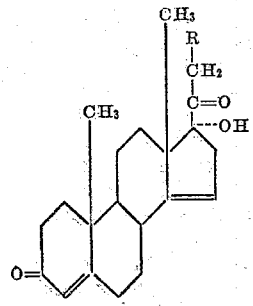

wherein R is chosen from the class consisting of hydroxyl and hydrocarbon acyloxy groups containing from one to ten carbon atoms in the added moiety, said process comprising treating a compound having the formula

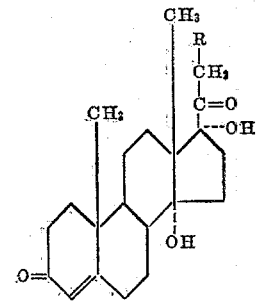

wherein R is chosen from the class consisting of hydroxyl and hydrocarbon acyloxy groups containing from one to ten carbon atoms in the added moiety, with a non-oxidizing strong acid in the presence of an organic solvent.

3. A process for preparing a compound having the formula

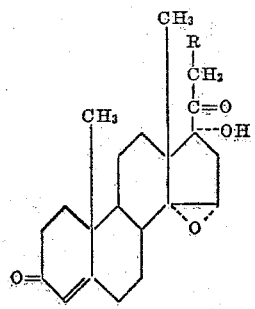

wherein R is chosen from the class consisting of hydroxyl and hydrocarbon acyloxy groups containing from one to ten carbon atoms in the added moiety, said process comprising treating a compound having the formula

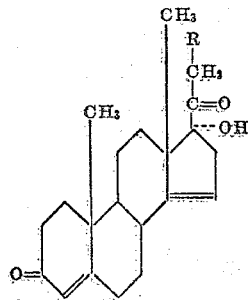

wherein R is chosen from the class consisting of hydroxyl and hydrocarbon acyloxy groups containing from one to ten carbon atoms in the added moiety, with an oxidizing agent selected from the group consisting of organic peracids and chromate oxidizing agents.

4. A compound having the formula

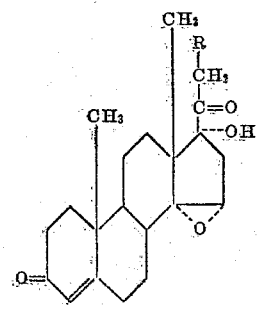

wherein R is selected from the class consisting of hydroxyl and hydrocarbon acyloxy groups containing from one to ten carbon atoms in the added moiety.

References Cited in the file of this patent

UNITED STATES PATENTS

| | | |
|---|---|---|
| 2,602,769 | Murray | July 8, 1952 |
| 2,649,401 | Haines | Aug. 18, 1953 |
| 2,656,349 | Ruzicka | Oct. 20, 1953 |
| 2,658,023 | Shull et al. | Nov. 3, 1953 |
| 2,673,866 | Murray | Mar. 30, 1954 |
| 2,684,364 | Jones | July 20, 1954 |
| 2,732,383 | Bernstein et al. | Jan. 14, 1956 |
| 2,733,240 | Rosenkranz et al. | Jan. 31, 1956 |

(Other references on following page)

UNITED STATES PATENTS

| | | |
|---|---|---|
| 2,748,149 | Reichstein | May 29, 1956 |
| 2,752,372 | Reichstein | June 26, 1956 |
| 2,756,179 | Fried et al. | July 24, 1956 |
| 2,763,671 | Fried et al. | Sept. 18, 1956 |
| 2,773,076 | Reichstein | Dec. 4, 1956 |
| 2,788,354 | Angello et al. | Apr. 9, 1957 |

FOREIGN PATENTS

| | | |
|---|---|---|
| 514,437 | Great Britain | 1939 |
| 522,870 | Great Britain | 1939 |

OTHER REFERENCES

Chemistry and Industry, February 4, 1956, Communications to Editor, pages 111–112, Seymour Bernstein et al.